US006554538B2

(12) United States Patent
Stockstill (10) Patent No.: US 6,554,538 B2
(45) Date of Patent: Apr. 29, 2003

(54) REEL TYPE PIPELINE LAYING SHIP AND METHOD

(75) Inventor: Lyle Stockstill, Belle Chasse, LA (US)

(73) Assignee: Torch Offshore, Inc., Gretna, LA (US)

( * ) Notice: Subject to any disclaimer, the term of this patent is extended or adjusted under 35 U.S.C. 154(b) by 0 days.

(21) Appl. No.: 09/898,561

(22) Filed: Jul. 3, 2001

(65) Prior Publication Data

US 2003/0044234 A1 Mar. 6, 2003

(51) Int. Cl.$^7$ .................................. F16L 1/12
(52) U.S. Cl. ................. 405/168.3; 405/166; 405/168.4; 405/170
(58) Field of Search ........................... 405/168.3, 168.4, 405/168.2, 168.1, 169, 170, 173, 166, 158, 154.1

(56) References Cited

U.S. PATENT DOCUMENTS

| | | |
|---|---|---|
| 3,237,438 A | 3/1966 | Tesson |
| 3,331,212 A | 7/1967 | Cox et al. |
| 3,372,461 A | 3/1968 | Tesson |
| 3,581,506 A | 6/1971 | Howard |
| 3,680,342 A | 8/1972 | Mott et al. |
| 3,685,306 A | 8/1972 | Mott |
| 3,775,987 A | 12/1973 | Rochelle et al. |
| 3,945,580 A | 3/1976 | Veyrassat |
| 3,952,960 A | 4/1976 | Veyrassat |
| 3,982,402 A | 9/1976 | Lang et al. |
| 4,012,001 A | 3/1977 | Knox |
| RE29,591 E | 3/1978 | Lloyd |
| 4,112,695 A | 9/1978 | Chang et al. |
| 4,157,023 A | 6/1979 | Tisdale et al. |
| 4,165,571 A | 8/1979 | Chang et al. |
| 4,218,158 A | 8/1980 | Tesson |
| 4,230,421 A | 10/1980 | Springett et al. |
| 4,243,345 A | 1/1981 | Cha et al. |

(List continued on next page.)

FOREIGN PATENT DOCUMENTS

| | | |
|---|---|---|
| AU | 696337 B2 | 9/1998 |
| DE | 2425249 | 1/1995 |
| EP | 302038 | 2/1989 |

(List continued on next page.)

Primary Examiner—Frederick L. Lagman
(74) Attorney, Agent, or Firm—Garvey, Smith, Nehrbass & Doody, L.L.C.; Stephen R. Doody; Brett A. North (57) ABSTRACT

A pipeline laying ship and an improved method of laying a pipeline in a marine environment is disclosed. The pipeline laying ship is a dynamically positioned barge or self-propelled dynamically positioned vessel with a hull having a deck area that supports a pair of reels. The reels are independently rotatable, and are position to generally port and starboard relative to one another. A pipe joint storage area is provided for containing multiple joints of pipe. One or more pipeline welding stations are provided on the deck next to the reels, the pipeline welding stations being positioned to join the joints of pipe together to form an elongated pipeline that can be wound upon a selected reel of said pair of reels. A tower is provided for guiding the elongated pipeline as it is unwound from a selected reel, the tower including at least a bend controller, a straightener and a tensioner. The welding stations and tower are each transversely and movably mounted upon the hull between the port and starboard positions that enable a pipeline to be welded and then wound upon either of the reels and to be unwound from either of the reels for launching to the sea bed via the tower.

26 Claims, 7 Drawing Sheets

U.S. PATENT DOCUMENTS

| | | | |
|---|---|---|---|
| 4,260,287 A | 4/1981 | Uyeda et al. | |
| 4,269,540 A | 5/1981 | Uyeda et al. | |
| 4,274,799 A | 6/1981 | Tisdale, III et al. | |
| 4,297,054 A | 10/1981 | Yenzer et al. | |
| RE30,846 E | 1/1982 | Lang et al. | |
| 4,340,322 A | 7/1982 | Springett et al. | |
| 4,345,855 A | 8/1982 | Uyeda et al. | |
| 4,353,515 A | 10/1982 | Weaver et al. | |
| 4,448,568 A * | 5/1984 | Gentry et al. | 405/168.3 |
| 4,454,999 A | 6/1984 | Woodruff | |
| 4,486,123 A | 12/1984 | Koch et al. | |
| 4,493,463 A | 1/1985 | Rivinius | |
| 4,538,937 A | 9/1985 | Lynch | |
| 4,558,971 A | 12/1985 | David | |
| 4,591,294 A | 5/1986 | Foulkes | |
| 4,594,871 A | 6/1986 | de Boer | |
| 4,649,954 A | 3/1987 | Dunwoody | |
| 4,659,253 A * | 4/1987 | Jacobson | 405/166 |
| 4,687,376 A | 8/1987 | Recalde | |
| 4,721,410 A * | 1/1988 | Recalde | 405/168.3 |
| 4,723,874 A | 2/1988 | Recalde | |
| 4,765,776 A | 8/1988 | Howson | |
| 4,789,108 A * | 12/1988 | Recalde | 405/166 |
| 4,802,794 A | 2/1989 | Lynch | |
| 4,820,082 A | 4/1989 | Recalde | |
| 4,913,080 A | 4/1990 | Kindem et al. | |
| 4,961,671 A | 10/1990 | Recalde | |
| 4,984,934 A | 1/1991 | Recalde | |
| 4,992,001 A | 2/1991 | Harrison | |
| 5,044,825 A | 9/1991 | Kaldenbach | |
| 5,348,423 A | 9/1994 | Maloberti et al. | |
| 5,413,434 A | 5/1995 | Stenfert et al. | |
| 5,421,675 A | 6/1995 | Brown et al. | |
| 5,527,134 A | 6/1996 | Recalde | |
| 5,533,834 A | 7/1996 | Recalde | |
| 5,573,353 A | 11/1996 | Recalde | |
| 5,590,915 A | 1/1997 | Recalde | |
| 5,630,678 A | 5/1997 | Branchut et al. | |
| 5,718,538 A | 2/1998 | Recalde | |
| 5,823,712 A | 10/1998 | Kalkman et al. | |
| 5,836,719 A | 11/1998 | Martin et al. | |
| 5,971,666 A | 10/1999 | Martin et al. | |
| 5,975,802 A | 11/1999 | Willis | |
| 5,986,236 A | 11/1999 | Gainand et al. | |
| 6,004,071 A | 12/1999 | Broeder et al. | |
| 6,056,478 A * | 5/2000 | Martin et al. | 405/168.3 |
| 6,089,489 A | 7/2000 | Cruickshank | |
| 6,149,347 A | 11/2000 | Scott | |
| 6,361,250 B1 * | 3/2002 | de Varax | 405/168.3 |
| 4,260,287 A | 4/1981 | Uyeda et al. | |
| 4,269,540 A | 5/1981 | Uyeda et al. | |
| 4,274,799 A | 6/1981 | Tisdale, III et al. | |
| 4,297,054 A | 10/1981 | Yenzer et al. | |
| RE30,846 E | 1/1982 | Lang et al. | |
| 4,340,322 A | 7/1982 | Springett et al. | |
| 4,345,855 A | 8/1982 | Uyeda et al. | |
| 4,353,515 A | 10/1982 | Weaver et al. | |
| 4,448,568 A * | 5/1984 | Gentry et al. | 405/168.3 |
| 4,454,999 A | 6/1984 | Woodruff | |
| 4,486,123 A | 12/1984 | Koch et al. | |
| 4,493,463 A | 1/1985 | Rivinius | |
| 4,538,937 A | 9/1985 | Lynch | |
| 4,558,971 A | 12/1985 | David | |
| 4,591,294 A | 5/1986 | Foulkes | |
| 4,594,871 A | 6/1986 | de Boer | |
| 4,649,954 A | 3/1987 | Dunwoody | |
| 4,659,253 A * | 4/1987 | Jacobson | 405/166 |
| 4,687,376 A | 8/1987 | Recalde | |
| 4,721,410 A * | 1/1988 | Recalde | 405/168.3 |
| 4,723,874 A | 2/1988 | Recalde | |
| 4,765,776 A | 8/1988 | Howson | |
| 4,789,108 A * | 12/1988 | Recalde | 405/166 |
| 4,802,794 A | 2/1989 | Lynch | |
| 4,820,082 A | 4/1989 | Recalde | |
| 4,913,080 A | 4/1990 | Kindem et al. | |
| 4,961,671 A | 10/1990 | Recalde | |
| 4,984,934 A | 1/1991 | Recalde | |
| 4,992,001 A | 2/1991 | Harrison | |
| 5,044,825 A | 9/1991 | Kaldenbach | |
| 5,348,423 A | 9/1994 | Maloberti et al. | |
| 5,413,434 A | 5/1995 | Stenfert et al. | |
| 5,421,675 A | 6/1995 | Brown et al. | |
| 5,527,134 A | 6/1996 | Recalde | |
| 5,533,834 A | 7/1996 | Recalde | |
| 5,573,353 A | 11/1996 | Recalde | |
| 5,590,915 A | 1/1997 | Recalde | |
| 5,630,678 A | 5/1997 | Branchut et al. | |
| 5,718,538 A | 2/1998 | Recalde | |
| 5,823,712 A | 10/1998 | Kalkman et al. | |
| 5,836,719 A | 11/1998 | Martin et al. | |
| 5,971,666 A | 10/1999 | Martin et al. | |
| 5,975,802 A | 11/1999 | Willis | |
| 5,986,236 A | 11/1999 | Gainand et al. | |
| 6,004,071 A | 12/1999 | Broeder et al. | |
| 6,056,478 A * | 5/2000 | Martin et al. | 405/168.3 |
| 6,089,489 A | 7/2000 | Cruickshank | |
| 6,149,347 A | 11/2000 | Scott | |
| 6,361,250 B1 * | 3/2002 | de Varax | 405/168.3 |
| 6,371,694 B1 * | 4/2002 | de Varax et al. | 405/168.3 |

FOREIGN PATENT DOCUMENTS

| | | |
|---|---|---|
| EP | 507572 A1 | 7/1992 |
| EP | 1063163 A2 | 12/2000 |
| FR | 2447852 | 8/1980 |
| GB | 2046207 A | 11/1980 |
| GB | 2178129 A | 2/1987 |
| GB | 2199631 A | 7/1988 |
| GB | 2210673 A | 6/1989 |
| GB | 2287518 A | 9/1995 |
| GB | 2296956 A1 | 7/1996 |
| GB | 2302157 A | 1/1997 |
| GB | 2287297 B | 6/1997 |
| JP | 4-145818 | 5/1992 |
| RU | 0715431 | 2/1980 |
| RU | 2090433 | 9/1997 |
| WO | WO9525237 A1 | 9/1995 |
| WO | WO9525238 A1 | 9/1995 |
| WO | WO9627751 A1 | 9/1996 |
| WO | WO01/07812 A1 | 2/2001 |

\* cited by examiner

REEL TYPE PIPELINE LAYING SHIP AND METHOD

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the placement of pipelines in a marine environment. More particularly, the present invention relates to an improved method and apparatus for laying a pipeline in a marine environment, wherein a specially configured pipeline laying ship provides a hull with a deck having a pair of reels independently rotatable during use, and wherein a pipeline fabricating "firing line" fabricates a pipeline that is then wound upon one of the selected reels. The pipeline "firing line" can be moved laterally in order to align with either of the reels as selected. Additionally, the pipeline can be payed out from either of the selected reels after it has been fabricated. A tower is provided for directing the pipeline from the reel through bend control and straightening stations and then to the seabed.

2. General Background of the Invention

For many years, pipelines have been fabricated at sea and lowered to the seabed at a desired location. For example, early patents to Tesson include U.S. Pat. Nos. 3,237,438 and 3,337,469 that are directed to a pipeline laying barge and method of operation. In the Tesson patents, the joints of pipe are welded on deck and then spooled or wound upon a reel. At a desired location, the pipeline is then placed on the seabed by unwinding the pipe from the reel and straightening it before it is lowered to the seabed.

A tilting tower has also been used to lower a pipeline to the seabed as the pipeline is being unwound from a reel. An example of such a titling tower and reel pipeline laying arrangement can be seen in the Uyeda U.S. Pat. No. 4,345,855 as an example. A similar arrangement is seen in the Springett U.S. Pat. No. 4,340,322. The Uyeda U.S. Pat. No. 4,345,855 and the Springett U.S. Pat. No. 4,430,322 are hereby incorporated herein by reference. Another method of laying a pipeline is through the use of a stinger. A stinger is simply an elongated boom structure that extends from usually one end of a hull or barge. The stinger supports the pipeline as it is being lowered to the seabed. Examples of the use of stingers can be seen us U.S. Pat. Nos. RE28,922, RE29,591 and 5,533,834.

Reel type pipeline laying systems are typically employed in deep water situations. While it is known to weld the pipeline joints on the deck of a vessel and wind them upon a reel (for example, see the above discussed Tesson patents), it is also known to weld the pipeline on shore and then wind it upon the reel before the ship leaves port.

The following table provides an exemplary listing of patents that are known to applicant and that relate to pipeline laying vessels and methods of operation:

MARINE PIPE LAYING PATENTS

| PAT. NO. | TITLE | INVENTOR |
|---|---|---|
| 3,237,438 | Pipe Line Laying Barge | Tesson |
| 3,372,461 | Method of Laying Pipeline | Tesson |
| Re.28,922 | Column Stabilized Stinger | Lloyd, III |
| 3,982,402 | Submarine Pipeline Laying Vessel | Lang et al. |
| Re.29,591 | Column Stabilized Stinger Transition Segment And Pipeline Supporting Apparatus | Lloyd |
| 4,112,695 | Sea Sled For Entrenching Pipe | Chang et al. |
| 4,165,571 | Sea Sled With Jet Pump For Underwater Trenching And Slurry Removal | Chang et al. |
| 4,218,158 | Pipe Handling Method And Apparatus | Tesson |
| 4,230,421 | Self Propelled Dynamically Positioned Reel Pipe Laying Ship | Springett et al. |
| 4,260,287 | Portable Reel Pipelaying Method | Uyeda et al. |
| 4,268,190 | Pipe Handling Method And Apparatus | Tesson |
| 4,269,540 | Self Propelled Dynamically Positioned Reel Pipe Laying Ship | Uyeda et al. |
| 4,297,054 | Method of Laying Offshore Pipeline From a Reel Carrying Vessel | Yenzer et al. |
| 30,846 | Submarine Pipeline Laying Vessel | Lang et al. |
| 4,340,322 | Self Propelled Dynamically Positioned Reel Pipe Laying Ship | Springett et al. |
| 4,345,855 | Self Propelled Dynamically Positioned Reel Pipe Laying Ship | Uyeda et al. |
| 4,486,123 | Underwater Pipe Laying Vessel | Koch et al. |
| 4,687,376 | Multi-Reel Operational Lines Laying Vessel | Recalde |
| 4,721,411 | Multi-Reel Operational Lines Laying Vessel | Recalde |
| 4,723,874 | Multi-Reel Operational Lines Laying Vessel | Recalde |
| 4,765,776 | Convertible Barge | Howson |
| 4,789,108 | Multi-Reel Operational Lines Laying Vessel | Recalde |
| 4,820,082 | Pipeline Laying System And Vessel | Recalde |
| 4,917,540 | Pipeline Laying System And Vessel With Pipeline Straightening And Tensioning Device | Recalde |
| 4,961,671 | Method of Converting a Pipeline Laying Vessel From a Pivotal Ramp Type To An Arcuate Type | Recalde |
| 4,984,934 | Pipeline Laying System And Vessel And Method of Spooling Lines Onto The Vessel | Recalde |
| 5,044,825 | Method And Installation For Laying a Pipeline | Kaldenbach |
| 5,413,434 | Method And Installation For Laying a Pipeline | Stenfert et al. |
| 5,527,134 | Pipelaying Vessel | Recalde |
| 5,533,834 | Pipelay Stinger | Recalde |
| 5,836,719 | Pipe Laying Vessel and Method | Martin et al. |
| 5,971,666 | Pipe Laying Vessel | Martin et al. |
| 5,975,802 | Pipeline Laying Apparatus | Willis |
| 6,004,071 | Methods of Installing Elongate Underwater Structures | Broeder et al. |
| PATENT | TITLE | ISSUED |
| WO9525238A1 | Pipe Laying Vessel and Method | Sept. 21, 1995 |
| WO9525237A1 | Pipe Laying Vessel and Method | Sept. 21, 1995 |
| AU1898395A1 | Pipe Laying Vessel and Method | Oct. 03, 1995 |
| AU1898295A1 | Pipe Laying Vessel and Method | Oct. 03, 1995 |
| AU4088796A1 | Pipeline Laying | Jul. 25, 1996 |
| AU676431B2 | Pipe Laying Vessel and Method | Mar. 06, 1997 |
| AU681014B2 | Pipe Laying Vessel and Method | Aug. 14, 1997 |
| AU696337B2 | Pipeline Laying | Sept. 10, 1998 |
| BR9507088A | Processo Para Assentar Uma Tubulacao Submarina E Embarcacao Para Ser Utilizada No Assentamento De Uma Tubulacao Submarina | Sept. 16, 1997 |
| BR9507064A | Processo Para Assentar Uma Tabulacao Submarina E Embarcacao Para Ser Utilizada No | Oct. 14, 1997 |

-continued

MARINE PIPE LAYING PATENTS

| | | |
|---|---|---|
| BR9600055A | AssentamentoDe Uma Tubulacao Submarina Sistema De Colocacao De Tubos Navio Conduzindo Um Sistema De Colocacao De Tubos E Processo Colocacao De Uma Tubulacao De Um Navio | Jan. 21, 1998 |
| GB2287518B | Pipe Laying Vessel and Method | Mar. 12, 1997 |
| GB2287518A | Pipe Laying | Sept. 20, 1995 |
| GB2296956B2 | | Mar. 10, 1999 |
| GB2296956B | Pipeline | Mar. 10, 1999 |
| GB2296956A1 | | Jul. 17, 1996 |
| GB2296956A | Pipeline Laying with Bending and Straightening | Jul. 17, 1996 |
| GB2302157B | Pipe Laying Vessel and Method | Nov. 12, 1997 |
| GB2302157A | Pipe Laying Vessel and Method | Jan. 08, 1997 |
| GB9411702A0 | | Aug. 03, 1994 |
| GB9500664A0 | | Mar. 8, 1995 |
| GB9505344A | Pipe Laying Vessel and Method | May 03, 1995 |
| GB9600005A0 | | Mar. 06, 1996 |
| GB9600005A | Pipeline Laying | Mar. 06, 1996 |
| GB9619167A | Pipe Laying Vessel and Method | Oct. 23, 1996 |
| NO960135A0 | Roerlednings-leggesystem | Jan. 11, 1996 |
| NO960135A | Roerlednings-leggesystem | Jul. 15, 1996 |
| NO963858A0 | Roerleggingsfartoey Og Fremgangsmaate | Sept. 13, 1996 |
| NO963858A | Roerleggingsfartoey Og Fremgangsmaate | Nov. 11, 1996 |
| NO963857A0 | Roerleggingsfartoey Og Fremgangsmaate | Sept. 13, 1996 |
| NO963857A | Roerleggingsfartoey Og Fremgangsmaate | Nov. 11, 1996 |

GENERAL DISCUSSION OF THE PRESENT INVENTION

The present invention provides an improved pipeline laying vessel and its method of operation. The method employs a dynamically positioned barge or self-propelled dynamically positioned reel ship that has two independently rotatable reels or drums. The ship has a deck area that enables pipe joints to be welded together to form a pipeline. Joints of pipe are placed in a storage area on the deck of a vessel in suitable pipe racks. Welding stations near this storage area are arranged to receive multiple joints of pipe that have been internally cleaned and prepared for welding. Part of this preparation can include for example end bevels that are applied to the pipeline.

As pipeline fabrication proceeds, pipe joints are moved from the rack storage areas to the pipeline fabrication area, also referred to herein as the "firing line."

This fabrication area or "firing line" can comprise essentially a set of rollers supporting the pipeline along the center line of the fabrication area. Welding equipment (manual or automatic) can be provided together with known weld preparation tools.

The incoming pipe joints are aligned with the pipeline being fabricated. The welded area between the pipe joints and the joints previously welded together can be adjusted as required. The pipe joints are progressively welded together to form a pipeline at multiple welding stations. The welds are tested and field joints are then coated at another work station located in the pipeline fabrication area.

When one or more joints of pipe have been welded together end-to-end on the firing line, a selected reel or drum is readied for storage of the assembled pipeline on provided reels or drums. In keeping with the present invention, two (2) reels or drums are provided. A selected length (eg. about forty feet) of pipeline is advanced at any time and wound upon the reel by plastic bending. The pipeline moves ahead in the pipeline fabrication area by the same distance (eg. 40 feet increments) through a back tensioning device.

The pipeline welding progresses until the selected drum or reel is filled with the pipeline that is being welded on the deck of the vessel. Each reel or drum can be between 30 and 50 feet in diameter, have a width of between about 10–20 feet, and store, eg. 30,000–50,000 feet of six inch pipe.

In order to arrange properly the pipeline on the selected reel drum during spooling, the firing line travels from one side of the ship to the other side in a coordinated back and forth direction to spool each wrap of the pipeline next to the previous wrap on the reel.

The firing line also travels from one side of the ship to the other side if it is to align with the second drum, so that the pipeline fabricated on the ship deck can be spooled on either one of the reels. In other words, the pipeline "firing line" moves laterally as it is being spooled upon a first reel. However, the entire firing line travels transversely on the ship's deck a larger distance in order to align with the second reel when the second reel is to be filled with pipeline.

When the ship undertakes pipe laying on the sea bottom, the pipeline that is stored on a selected reel leaves the drum in a direction tracking toward the top of the tilting tower. The titling tower can tilt in a position that varies such as for example between about 65 and 95 degrees from the deck plane. At the top of the tower, the pipeline bends through a bend controller downwardly toward the seabed. The tilting tower can also be provided with a device for straightening the pipeline, a tensioning device and a clamping device that can hold the pipeline and support the weight of the pipeline that extends downwardly toward the seabed.

It should be understood that the general concept of paying a wound pipeline from a reel to a tilting tower that has a bend controller, straightener, tensioner, and clamp mechanism is old and known in the art such as is shown in the above discussed Springett U.S. Pat. No. 4,340,322 and Uyeda U.S. Pat. No. 4,345,855 patents, each incorporated herein by reference.

With the improved arrangement of the present invention, the firing line and tower both move transversely in port to starboard and in starboard to port for two reasons. The firing line and tower move transversely in order to coordinate with the reel rotation, thus spooling the welded pipeline upon the reel or removing pipeline from the reel in an orderly fashion. Secondly, the firing line and tilting tower move transversely in order to align with either the first or the second drum as selected by the vessel operators. This larger transverse movement occurs when winding of the pipeline on the first reel is complete, and the winding of the pipeline on the second reel begins.

When leaving the bend controller, the pipeline passes through a straightening device that imposes a reversed plastic bending on the pipeline in order to straighten it. The straightened pipeline then passes through a vertical tensioner. The combined tension imposed on the pipeline by the tensioner and the drum back tension compensates for the suspended weight of the pipeline during its travel from the ship to the sea bottom. This tension is adjusted depending on the various pipe laying parameters such as pipeline characteristics (eg. diameter, wall thickness, coating, alloy, wet or dry lay) and water depth during lay operations. The proper tilting of the tower and the coordination of the tension with the ship as it moves along the pipeline route ensure that the stresses in the pipeline are maintained within predetermined predefined acceptable limits.

The area in between the last tensioner and the clamping mechanism or "hold off" clamp can be used to support the pipeline and install corrosion anodes and insulation coating when required on the pipeline joints that are welded in the pipeline fabrication area or "firing line," or in the tower itself. A work station can be used to initiate the pipeline, lay down, and testing devices at the beginning and the end of the pipeline lay operations from either of the two reels.

The pipeline eventually leaves the ship after passing through the hold off clamp that has the ability to hold the pipeline suspended weight during lay down operations.

For pipelines that cannot be coiled on the reel drums, the tilting tower can be arranged to weld linepipe joints at one work station and to perform nondestructive testing and field joint coating at another work station.

The tension required to hold the weight of the suspended part of the pipeline being laid is being provided by the tensioner located on the tilting ramp and, when required, by the tension from an A & R (abandonment and recovery) winch wire. This wire can be routed to the top end of the pipeline through a sheave located on top of the tower. In this case, collars are welded to the linepipe and are used to transfer the A & R winch rope tension to the pipeline.

When an umbilical or flexible line installation is required, the ship can load this product in either a large capacity rotating basket located, for example, below deck, or on several smaller reels located on the ship deck, depending on the number of products, product length, and pipe characteristic, or on one or both of the main reels.

Such products can be laid on the sea bottom independently or simultaneously with the pipeline and attached as a "piggyback" to the pipeline in the work station located in the tower. The product can be conveyed out of the storage areas to a position next and parallel to the pipeline in the tower by a second bend controller.

When a smaller diameter pipeline is to be laid (for example 2 inch–6 inch) with the main pipeline and as a piggyback to the main pipeline, this smaller pipeline is preferably fabricated on shore and stored on reels located on the ship's deck. This smaller pipeline is conducted to the same position described above for umbilicals and flexible lines in the tower or work station. In this case, the small diameter pipeline is plastically bent and is straightened by another straightening device installed next to the one used for the main pipeline.

The present invention thus provides a method and apparatus for laying rigid pipelines, such as for example between 3 and 12 inches in diameter, on a sea bed and to lay, simultaneously or in sequence, long lengths of flexible products (umbilicals) and simultaneously limited lengths of small diameter (between about 2 inches and 6 inches) rigid pipelines. The system of the present invention thus provides a dynamically positioned ship of adequate length, width and depth.

The ship provides a deck that has multiple areas for storing pipeline lengths (linepipe or pipe joints). The deck provides an area for fabricating the pipeline from line pipe (firing line). A pair of storage reels are provided, preferably port and starboard reels. These reels or drums are powered separately from each other. Each drum or reel provides a back tension of, for example about 50 Te on the pipeline when it is used for pipe laying.

An area below deck can be provided to locate flexible products storage including for example a rotating basket.

An area on the deck is provided to locate multiple storage reels and their drives.

An opening on the deck is provided to load and unload flexible products into the below deck rotating basket.

An opening can be provided in the ship's hull (moon pool) located, for example, approximately amidship.

A tilting tower is provided that preferably tilts between about 65 and 90 degrees from the deck plane.

A pipeline hold off clamp is located at the bottom end of the tilting tower. A retractable enclosure can be located at the middle part of the tilting tower to protect a provided work area.

Multiple pipeline tensioning devices can be provided, one located on the ship deck and one or two located vertically on the upper part of the tilting tower.

A device can be provided for straightening the pipeline during laying. A pipeline guiding device can be provided to conduct the pipeline from the reel that is used for pipe laying to the bend controller and straightener located on the tower.

A flexible product and small diameter rigid pipeline guiding device can be provided for conducting such products from their storage area on or below deck to the entry of the straightener.

Multiple work stations, such as welding stations can be provided on the tower.

A winch can be located below deck for lowering the pipeline to the sea floor when pipe laying is completed.

Multiple retractable sheaves can be used in conjunction with the winch.

The present invention thus provides an improved pipeline laying ship and its method of operation. The improved reel ship apparatus of the present invention includes a dynamically positioned barge or self-propelled dynamically positioned ship having a deck. A pair of reels or drums are supported upon the deck, each reel or drum being powered and independently rotatable. The reels are preferably positioned port and starboard relative to one another.

A pipe joint storage area is provided on the deck that contains multiple joints of pipe.

One or more pipeline welding stations on the deck define a "firing line" that is positioned next to the reels. The pipeline welding stations are also positioned to join the joints of pipe together to form an elongated pipeline that can be wound upon a selected reel of said pair of reels.

After a selected reel has been filled with a pipeline, a tower is provided for guiding the elongated pipeline as it is unwound from the selected reel during the pipeline laying operation. The tower can include a bend controller, a straightener, a tensioner and a clamp mechanism.

The welding stations and tower are movably mounted upon the hull along a transverse path between port and starboard positions. This enables a pipeline to be welded and then wound upon either of the reels. Later, the pipeline can be unwound from either of the reels for launching to the sea bed via the tower.

The reels are preferably each supported to rotate about a generally horizontal axis.

The reels are preferably positioned generally parallel to one another and generally in between the pipeline welding stations on deck and the tower.

The present invention provides an improved method of laying a pipeline on a sea bed. The method first progressively joins joints of pipe (eg. 40 foot joints) together upon the deck of a vessel at a firing line to form a long pipeline. The vessel includes a pair of reels and a tower for launching the pipeline. The method includes winding the pipeline upon a selected reel of the pair of reels as the lengths pipe are joined (eg. welded) together at the firing line.

The method further includes the step of bending the pipeline to approximate the curvature of a reel before winding the pipeline upon the selected reel. With the present invention, one reel can be paying out a completed pipeline for placement on the seabed while the other reel is simultaneously being wound with a pipeline as it is being fabricated at the firing line. Two or more pipelines can be fabricated, reeled and then unwound for placement, and, if desired, joined together to make one very long pipeline.

After a selected reel is fully wound with a pipeline of selected length, the selected reel is moved along a path in which the pipeline is to be layed while unwinding the pipeline from the reel and simultaneously straightening the pipeline.

The method of the present invention provides that the reels are independently rotatable so that either reel can be wound with a pipeline independently of the other.

The method further includes the step of moving the firing line in a port to starboard direction that aligns the pipeline as it is being formed with a selected reel.

The method of the present invention also includes moving the tower in a port to starboard direction that aligns the tower with a selected reel during unwinding.

The reels preferably rotate about a generally horizontal axis and the method can further include the step of passing the straightened pipeline through a tensioner.

In the method of the present invention, the combined tension imposed on the pipeline by the tensioners and a drum back tension compensate for the suspended weight of the pipeline during its travel from the hull to the sea bed.

The method of the present invention further comprises the step of adjusting the tension on the pipeline depending upon pipeline laying parameters that include pipeline characteristics and water depth during pipe laying operation.

The method further includes providing a tower to guide the pipeline from a selected reel to the sea bed. The method further comprises the step of coordinating the tension applied by the tensioner as the ship moves along the pipeline route to insure that the stresses in the pipeline are maintained with an acceptable limit.

The method of the present invention further includes the step of using a hold off clamp to support the pipeline so that corrosion anodes and insulation coating can be applied thereto.

DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
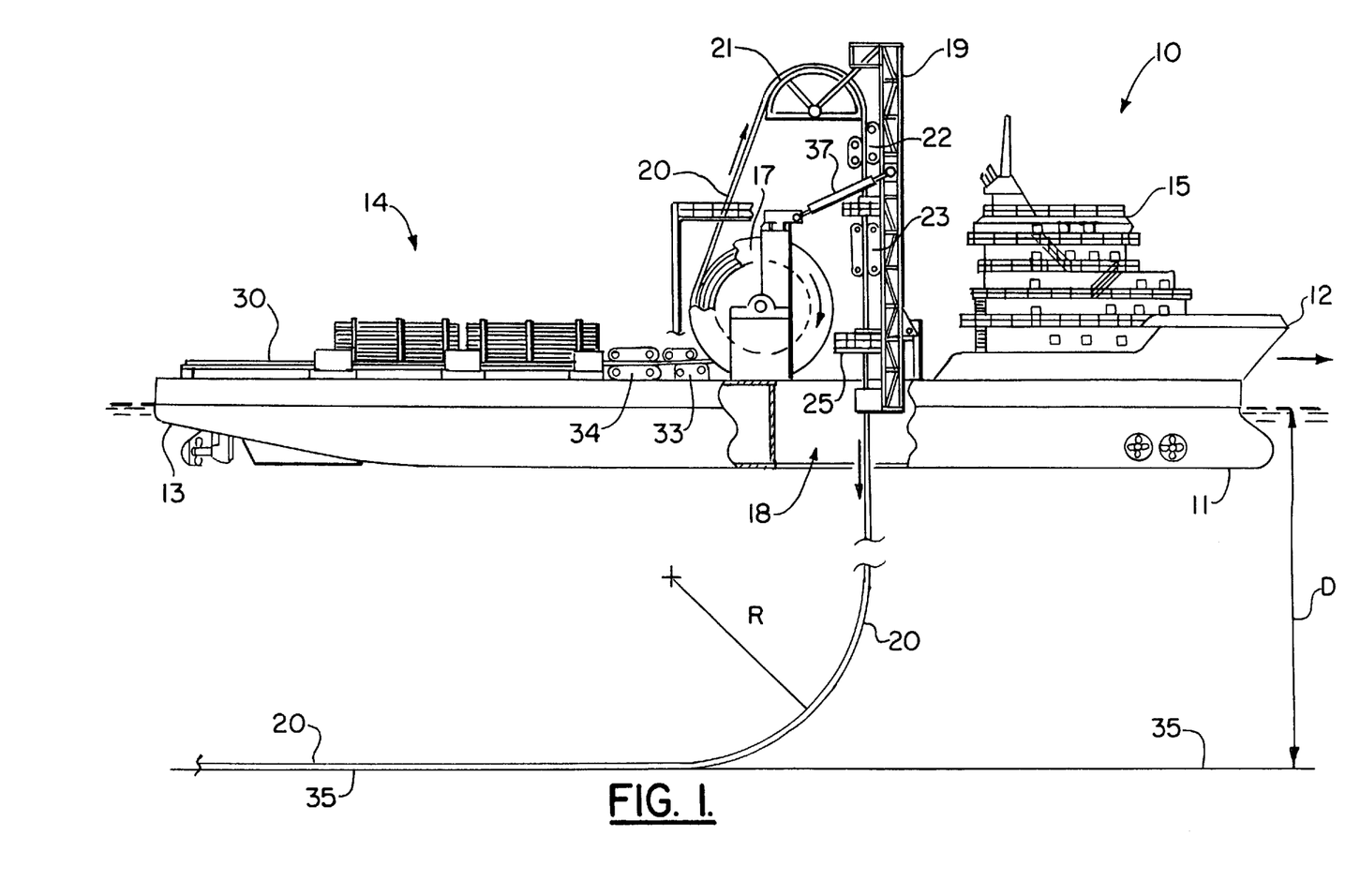
FIG. 1 is an elevation view showing the preferred embodiment of the apparatus of the present invention and illustrating the method of the present invention.
Figure 2:
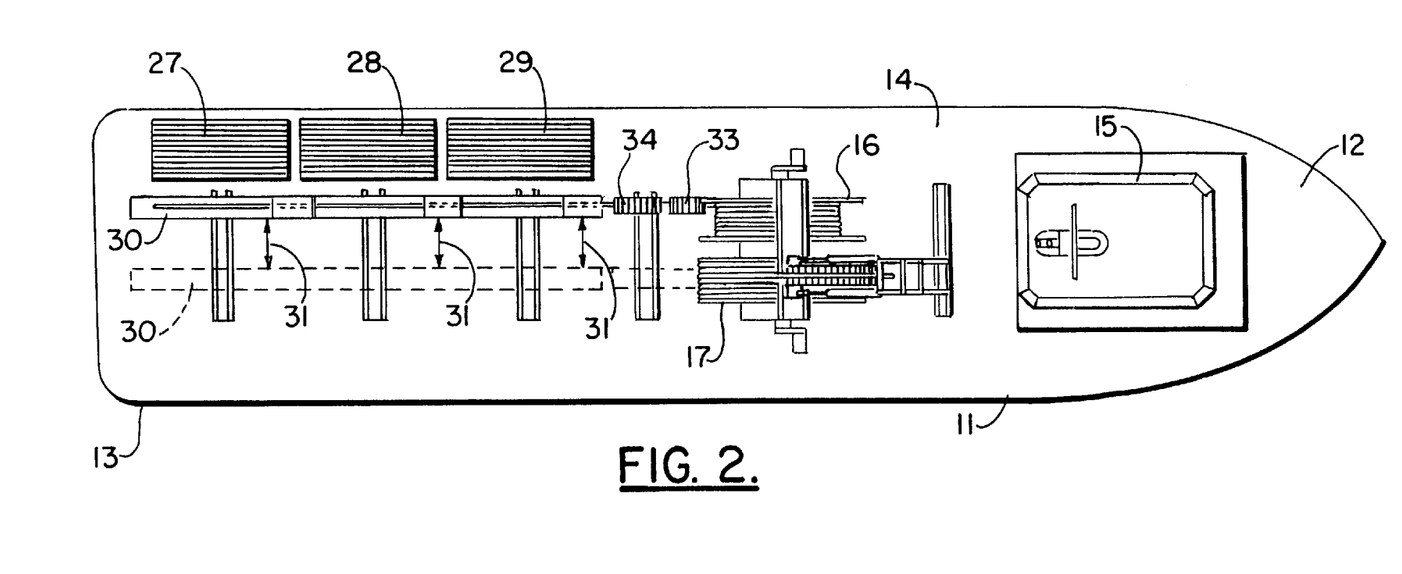
FIG. 2 is a plan view of the preferred embodiment of the apparatus of the present invention and showing the method of the present invention.
Figure 3:
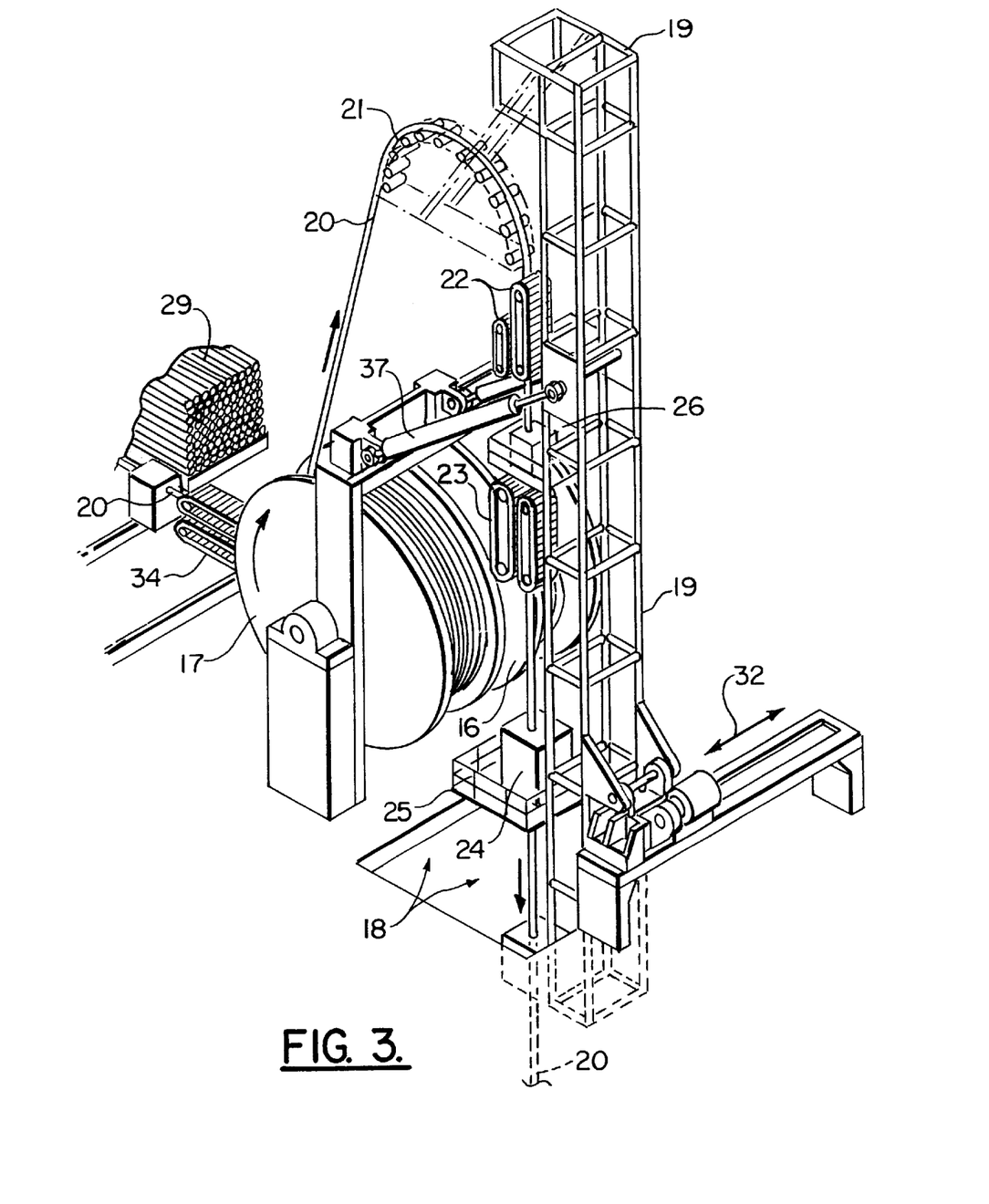
FIG. 3 is a fragmentary perspective view of the preferred embodiment of the apparatus of the present invention and illustrating the method of the present invention.
Figure 4:
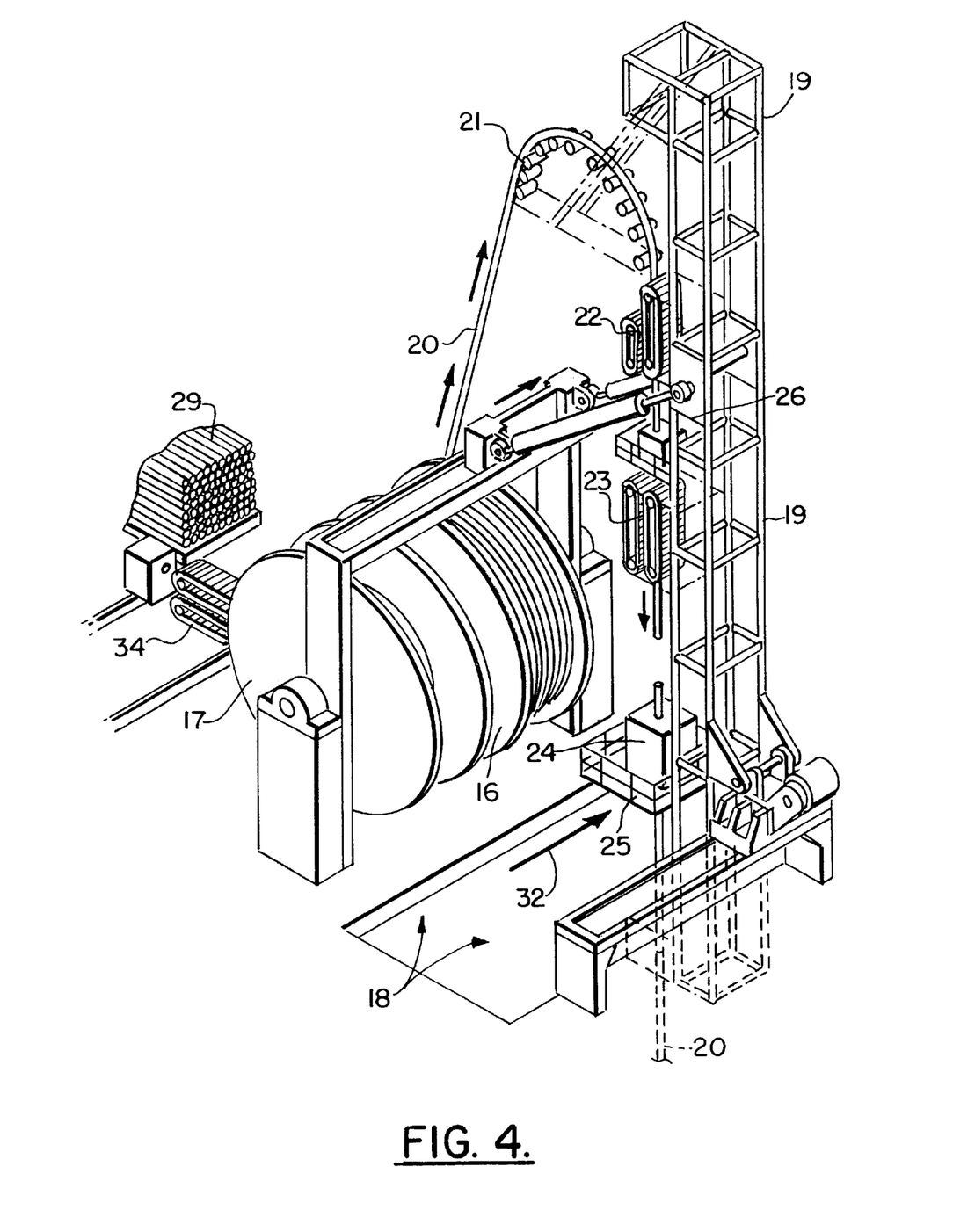
FIG. 4 is a fragmentary perspective view of the preferred embodiment of the apparatus of the present invention illustrating the method of the present invention.
Figure 5:
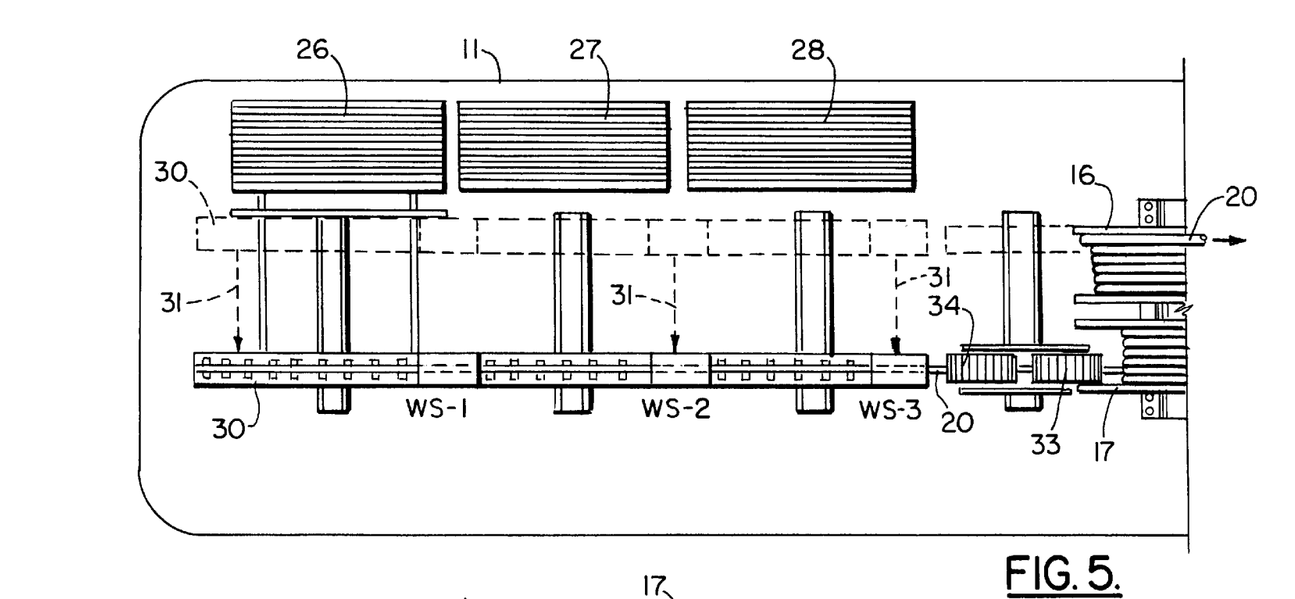
FIG. 5 is a fragmentary view of the preferred embodiment of the apparatus of the present invention and illustrating the method of the present invention.
Figure 6:
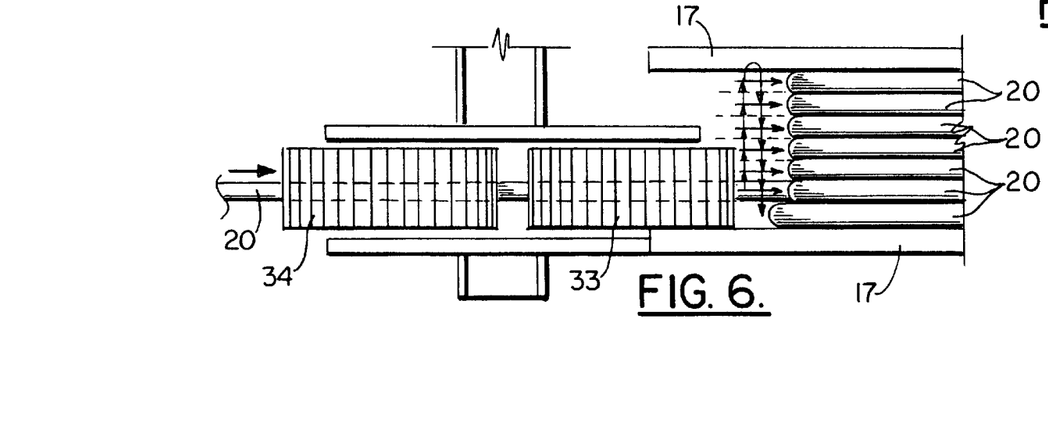
FIG. 6 is an enlarged fragmentary, plan view of the preferred embodiment of the apparatus of the present invention and illustrating the method of the present invention and illustrating the method of the present invention.

The attached drawing FIGS. 1 and 2 show a reel-type dynamically positioned barge or self-propelled dynamically positioned pipeline laying ship 10 that includes a hull 11 having bow 12 and stern 13 portions. A deck 14 supports a superstructure 15 that can include for example, accommodations for the crew, sleeping quarters, a galley, hospital, heliport, and the like. As pipeline fabrication proceeds, pipe joints are moved one by one from pipe rack storage areas 27, 28, 29 to the pipeline fabrication area, also referred to as the firing line 30.

This fabrication area or "firing line" 30 can comprise essentially a set of rollers supporting the pipeline 20 along the center line of the fabrication area 30. Welding equipment (manual or automatic) can be provided together with known weld preparation tools. The firing line 30 can be comprised of one or more welding stations.

Firing line 30 is an area of the deck that is a designated area for welding sections of pipe together to form a pipeline 20 that will be reeled upon a selected one of the drums or reels 16 or 17. These drums or reels 16 and 17 are preferably independently driven and independently rotatable.

Incoming pipe joints are aligned with the pipeline being fabricated. The welded area between the pipe joints and the joints previously welded together can be adjusted as required. The pipe joints are progressively welded together at multiple welding stations to form a pipeline 20.

In the stern area of the deck 14, a plurality of pipe storage racks 27, 28, 29 can be provided such as those shown in FIG. 2. Welding stations WS-1, WS-2, and WS-3 are positioned near these storage areas 27, 28, 29 and arranged to receive multiple joints of pipe that have been internally cleaned and prepared for welding. Part of this preparation can include, for example, end bevels that are applied to the pipeline. The welds are tested and field joints are then coated at another work station located in the pipeline fabrication area or firing line 30.

A trapezoidal through hull opening or moon pool 18 is provided amidships through which the pipeline 20 can be launched for placement on the seabed. A tilting tower 19 is supported by the hull 11 next to the moon pool 18, as shown in FIGS. 1 and 2. The moon pool 18 is preferably positioned in front of reels 16, 17 and behind the tilting tower 19. However, an alternative deck plan could position the tower 19 at stern 13. The reels 16, 17 could then be positioned near the stern 13 and in front of the tilting tower 19.

The tilting tower 19 includes a number of components including a bend controller 21, pipe straightener 22, tensioner 23, hold-off clamp 24, and a pair of welding stations at 25, 26.

The double arrows 31 in FIG. 2 indicate schematically that the firing line 30 can be selectively shifted between port and starboard positions along a traverse path. In this fashion, the pipeline 20 that is being welded upon the firing line 30 can be spooled upon either of the reels 16 or 17. The firing line 30 moves to port or to starboard in order to align with the selected reel 16 or 17.

A bending shoe 33 and tensioner 34 can be used to bend and tension the pipeline after it is welded and as it is being spooled upon a selected one of the drums 16 or 17. Each of these components (shoe 33 and tensioner 34) preferably move between port and starboard positions as indicated by arrows 31. As welding is completed, a selected reel 16 or 17 is readied for storage. In keeping with the present invention, two (2) reels or drums 16, 17 are provided. About 40 feet of pipeline is advanced and wound upon the selected reel by plastic bending. The pipeline 20 moves ahead in the pipeline fabrication area by the same distance (eg. forty feet increments) through a back tensioning device.

When the ship 10 undertakes pipe laying on the sea bottom 35, the pipeline 20 that is stored on a selected drum 16 or 17 leaves the drum 16 or 17 in a direction tracking toward the top of tilting tower 19. At the top of the tower 19, the pipeline 20 bends through a bend controller 21 downwardly toward the seabed 35. The tilting tower 19 can be provided with bend controller device 21 for bending the pipeline, a straightener 22 for straightening the pipeline, a tensioner 23 and a clamping device 24 that can hold the pipeline 20 and support the weight of the pipeline 20 that extends downwardly toward the seabed 35. When it is time to lay the pipeline 20, the tilting tower 19 can move between port and starboard positions as indicated schematically by the double arrow 32 in FIG. 2. The tilting tower 19 can align with a selected drum such as with the drum 17 in FIG. 2 as shown. The tilting tower 19 can tilt in a position that varies such as, for example, between about 65 and 90 degrees from deck plane 36.

With the improved arrangement of the present invention, the firing line 30 and tower 19 both move transversely back and forth for two reasons. The firing line 30 and tower 19 move transversely in order to coordinate with the reel rotation, thus spooling the welded pipeline 20 upon the selected reel in an orderly fashion. Secondly, the firing line 30 and tilting tower 19 move transversely in order to align with either the first 16 or the second 17 reel as selected by the vessel operators. This larger transverse movement occurs when winding of the pipeline 29 one the first reel 16 is complete, and the winding of the pipeline on the second reel 17 begins.

Figure 1A:
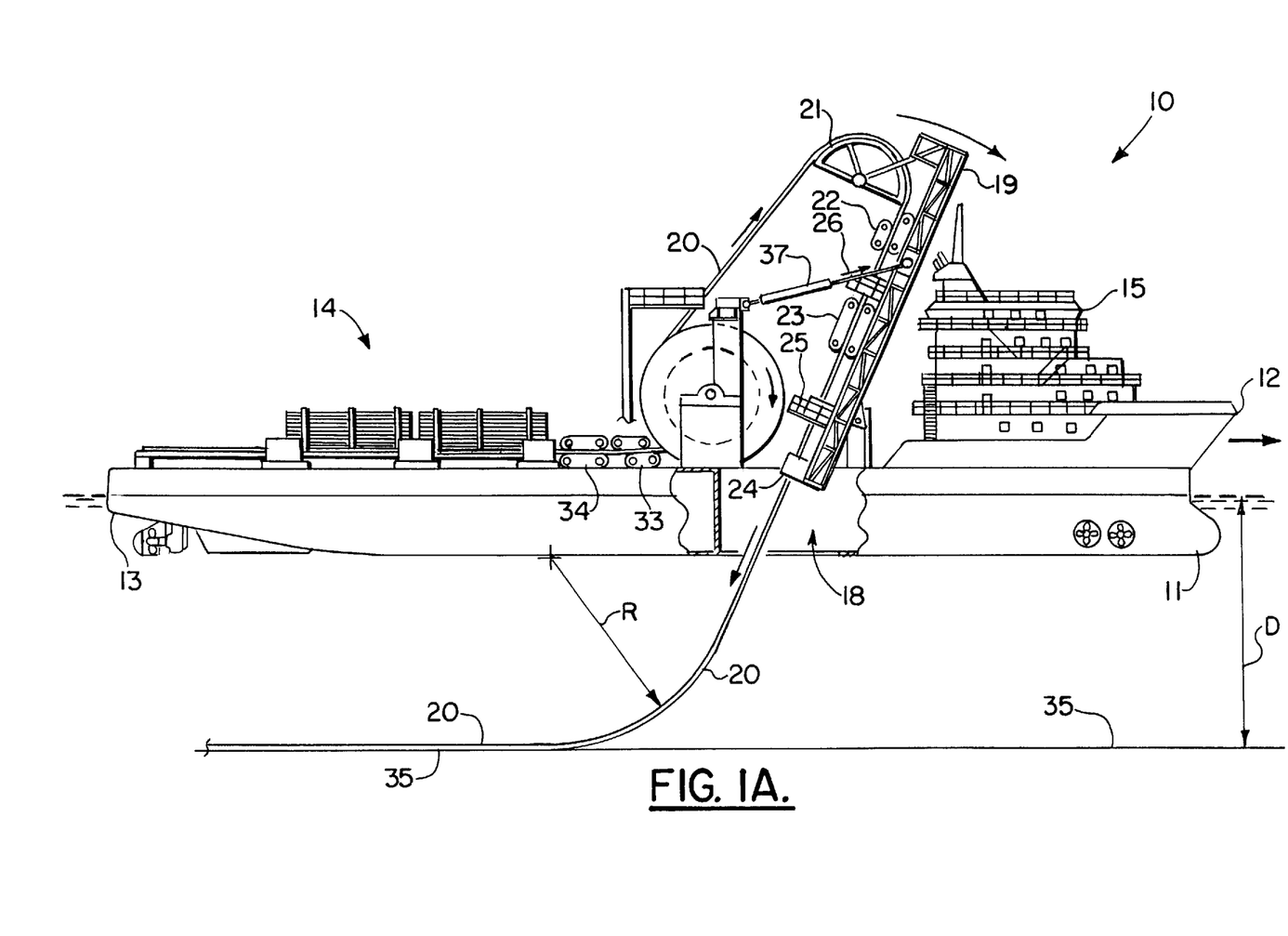
FIG. 1A is another elevation of the preferred embodiment of the apparatus of the present invention showing the tower in a tilted orientation.

When leaving the bend controller 21, the pipeline 20 passes through straightening device 22 that imposes a reversed plastic bending on the pipeline 20 in order to straighten it. The straightened pipeline 20 then passes through vertical tensioner 23. The reel back tension compensates for the suspended weight of the pipeline 20 during its travel from the ship hull 11 to the sea bottom 35. This tension is adjusted depending on the various pipe laying parameters such as pipeline characteristics and water depth during lay operations. The proper tilting of the tower 19 and the coordination of the tension as the hull 11 moves along the pipeline route ensure that the stresses in the pipeline 20 are maintained within a predetermined, predefined acceptable limits. Hydraulic cylinder 37 can be used to tilt tower 19 (see FIGS. 1 and 1A).

The welding station 25 in between the last tensioner 23 and the clamping mechanism or "hold off" clamp 24 can be used to support the pipeline 20 and install corrosion and insulation coating when required on the pipeline joints that are welded in the pipeline fabrication area 30 or "firing line," or in the tower 19 itself. A welding station 25 or 26 can be used to install pipeline initiation, lay down, and testing devices at the beginning and the end of the pipeline lay operations from either of the two reels 16, 17.

The pipeline 20 eventually leaves the ship hull 11 after passing through the hold off clamp 24 that has the ability to hold the pipeline suspended weight during lay down operations. For pipelines 20 that cannot be coiled on the reel drums, 16, 17 the titling tower 19 can be arranged to weld pipeline joints at one welding station 25 and to perform nondestructive testing and field joint coating at another welding station 26.

The tension required to hold the weight of the suspended part of the pipeline 20 being placed is being provided by the tensioner 23 located on the tilting tower. Assistance can be provided by the tension from an A & R winch wire to support the suspended weight of the pipeline 20. A winch wire can be routed to the top end of the pipeline 20 through a sheave located on top of the tower 19. In this case, collars are welded to the pipeline 20 and are used to transfer the A & R winch rope tension to the pipeline 20.

When an umbilical or flexible line installation is required, the ship 10 can load this product in either a large capacity rotating basket located for example below deck, or on one or both of the main reels 16, 17, or on several smaller reels located on the ship deck 14, depending on the number of products, product length and characteristics.

Such products can be placed to the sea bottom independently or simultaneously with the pipeline and attached as a "piggyback" to the pipeline in the work station located in the tower and the work station. The product is conducted out of the storage areas to a position next and parallel to the pipeline in the tower by a second bend controller.

When smaller diameter pipeline is to be placed (for example, 2 inch–6 inch) with the pipeline as a piggyback to the pipeline his smaller pipeline is preferably fabricated on shore and stored on reels located on the ship's deck 14. This pipeline is conducted to the same position described above for umbilicals and flexible lines in the tower or work station. In this case, the small diameter pipeline is plastically bent around the system and second conduit and is straightened by another straightening 30 device installed next to the one used for the main pipeline.

The present invention thus provides a method and apparatus for laying rigid pipelines, such as for example between 3 and inches in diameter, on a sea bed and to lay, simultaneously or in sequence, long lengths of flexible products (umbilicals) and simultaneously limited lengths of small diameter (between about 2 inches and 6 inches) rigid pipelines. When a smaller diameter pipeline is to be laid (for example 2 inch–6 inch) with the pipeline as a piggyback to the pipeline this smaller pipeline is preferably fabricated on shore and stored on reels located on the ship's deck. This pipeline is conducted to the same position described above for umbilicals and flexible lines in the tower or work station. In this case, the small diameter pipeline is plastically bent around the system and second conduit and is straightened by another straightening device installed next to the one used for the main pipeline.

One feature of the present invention is that one drum 16 can be loaded with a pipeline 20 as it is being welded together as a first operation independent of pipe laying. The other drum (previously loaded with a pipeline) can be rotated to pay out the pipeline 20 independently of the other drum, and route it through the tilting tower 19 and its components 22, 23, 24, 25, 26 to the moon pool 18 and then downwardly to lay upon the seabed. The invention has unique features that include the laterally traversing firing line and the two independently driven drums, either of which can, independently of and/or simultaneously with the other, receive a welded pipeline to be spooled, or pay out a spooled pipeline to be placed on the seabed 35.

Figure 7:
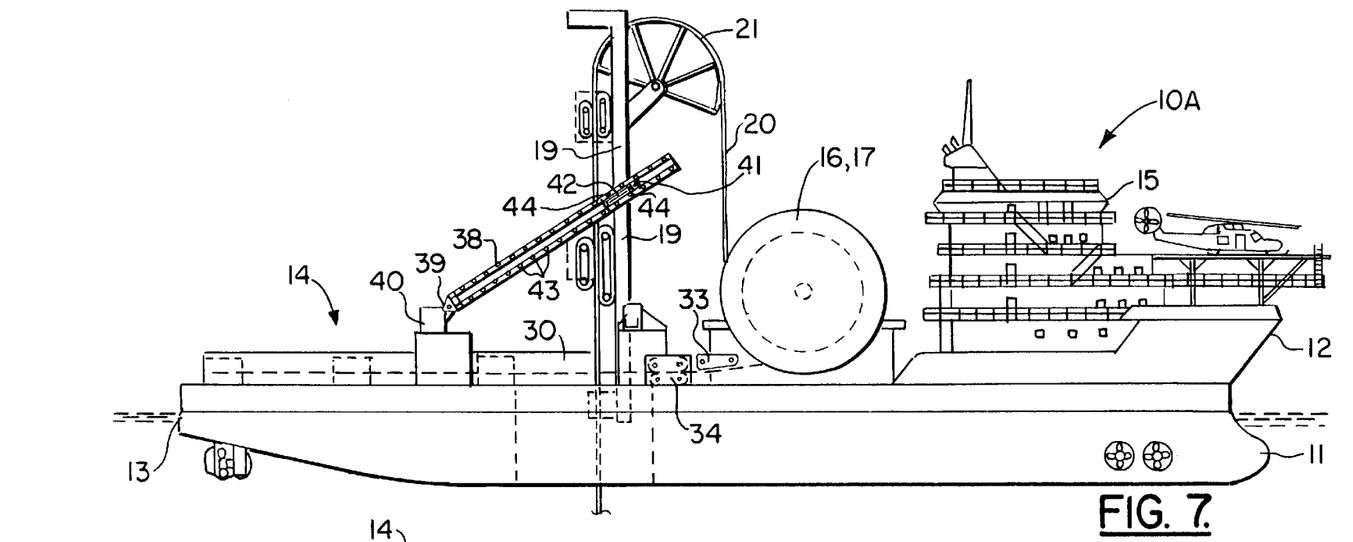
FIG. 7 is an elevation view showing an alternate embodiment of the apparatus of the present invention and illustrating an alternate method of the present invention.
Figure 8:
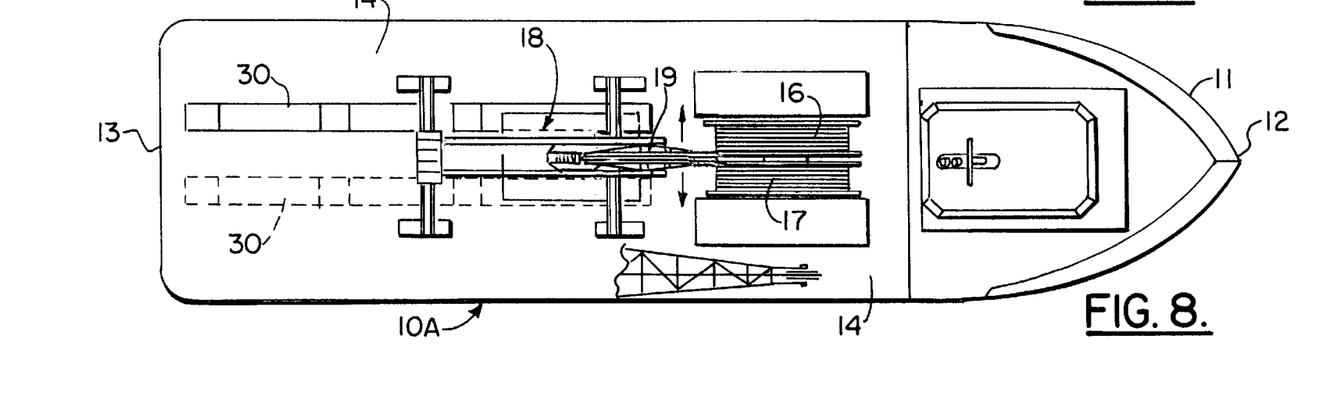
FIG. 8 is a plan view of the alternate embodiment of the apparatus of the present invention and illustrating the alternate method of the present invention.

FIGS. 7 and 8 show an alternate embodiment of the apparatus of the present invention designated generally by the numeral 10A. In FIGS. 7 and 8, reel pipeline lay barge 10A has a hull 11 that is similarly configured to the embodiment of FIGS. 1–6. However, the lay barge 10A of FIGS. 7 and 8 provides a different positioning for the port and starboard drums 16,17, the moon pool 18, and the tilting tower 19. In FIGS. 7 and 8, the reels or drums 16,17 are closer to the bow 12 of the hull 11. The tilting tower 19 is positioned immediately aft drums 16,17. Moon pool 18 is positioned aft tilting tower 19. The tilting tower 19 is thus positioned in between the moon pool 18 and the pair of drums or reels 16,17.

The tower 19 can be tilted using boom 38. Boom 38 can be connected to any suitable support 40 on hull 11 using, for example, a pinned connection 39.

A traveling member 42 can be slidably affixed to boom 38. The traveling member 42 can, for example, be one or more hydraulic cylinders that can be expanded or retracted during use. The boom 38 provides openings for 43 that are preferably regularly spaced along the length of the boom 38. Pins can be provided at end portions of the hydraulic cylinders for engaging the openings 43. The pins are preferably remotely operable using pneumatic or electrical controllers. In this fashion, the pins 44 can be inserted into selected of the openings 43 as the hydraulic cylinders are expanded and then contracted. The traveling member 42 can be moved in a ratchet fashion along the length of the boom 38 to change the angular position of the titling tower 19 relative to deck 14. The traveling member 42 can thus be pinned at pinned connection 41 to tilting tower 19.

Alternatively, a rack and pinion gear arrangement can interface between boom 38 and traveling member 42.

The following is a list of suitable parts and materials for the various elements of the preferred embodiment of the present invention.

PARTS LIST

| Part Number | Description |
| --- | --- |
| 10 | reel pipeline lay barge |
| 10A | reel pipeline lay barge |
| 11 | hull |
| 12 | bow |
| 13 | stern |
| 14 | deck |
| 15 | superstructure |
| 16 | port drum |
| 17 | starboard drum |
| 18 | moon pool |
| 19 | tilting tower |
| 20 | pipeline |
| 21 | bend controller |
| 22 | pipe straightener |
| 23 | tensioner |
| 24 | hold-off clamp |
| 25 | welding station |
| 26 | welding station |
| 27 | pipe storage |
| 28 | pipe storage |
| 29 | pipe storage |
| 30 | firing line |
| 31 | arrow |
| 32 | arrow |
| 33 | bending shoe |
| 34 | tensioner |
| 35 | sea bottom |
| 36 | deck plane |
| 37 | hydraulic cylinder |
| 38 | boom |
| 39 | pinned connection |
| 40 | support |
| 41 | pinned connection |
| 42 | traveling member |
| 43 | opening |
| 44 | pin |
| WS-1 | welding station |
| WS-2 | welding station |
| WS-3 | welding station |

The foregoing embodiments are presented by way of example only; the scope of the present invention is to be limited only by the following claims.

What is claimed is:

1. A pipeline laying ship comprising:
   a) a dynamically positioned hull that includes bow, stern and deck portions;
   b) a pair of reels supported upon the deck, each reel being independently rotatable, the reels being generally positioned port and starboard relative to one another;
   c) a pipe joint storage containing multiple joints of pipe;
   d) one or more pipeline welding stations on the deck and positioned to join said joints of pipe together to form an elongated pipeline that can be wound upon a selected reel of said pair of reels;
   e) a tower for guiding the elongated pipeline as it is unwound from a selected reel, the tower including at least a bend controller, a straightener and a tensioner; and
   f) wherein the welding stations and tower are movably mounted upon the hull between port and starboard positions that enable a pipeline to be welded and then wound upon either of the reels and to be unwound from either of the reels for launching to the seabed via the tower.

2. The pipeline laying ship of claim 1 wherein the reels are each supported to rotate about a generally horizontal axis.

3. The pipeline laying ship of claim 1 wherein the reels are generally parallel to one another.

4. The pipeline laying ship of claim 1 wherein there are one or more deck pipeline welding stations located on the deck and one or more tower pipeline welding stations located on the tower, and the reels are positioned in between the deck pipeline welding stations and the tower.

5. The pipeline laying apparatus of claim 1 wherein the welding stations are in between the reels and the hull stern.

6. The pipeline laying apparatus of claim 1 wherein the welding stations include a firing line that travels laterally so that a welded pipeline can be welded at the firing line and wound upon a selected reel in a manner that is coordinated with drum rotation.

7. A pipe laying ship comprising:
   a) a dynamically positioned hull having bow, stern, and deck portions, a deck moon pool opening through which a pipeline can be launched for laying on a seabed;
   b) a pair of reels supported upon the deck next to the moon pool opening, each reel being independently rotatable, the reels being generally positioned port and starboard relative to one another;
   c) one or more pipeline welding stations on the deck and positioned to weld joints of pipe together to form a pipeline that can be wound upon a selected reel;
   d) a tower for guiding a welded pipeline from a selected reel, the tower being positioned next to the moon pool and including at least a bend controller, a straightener and a tensioner; and
   e) wherein the welding stations and tower are each movable between port and starboard positions that enable a pipeline to be welded and then wound upon either of the reels and to be unwound from either of the reels for launching to the seabed.

8. The pipeline laying apparatus of claim 7 wherein the moon pool is in front of the reels.

9. The pipeline laying apparatus of claim 7 wherein the tower is in front of the moon pool.

10. The pipeline laying ship of claim 7 wherein the reels are each supported to rotate about a generally horizontal axis.

11. The pipeline laying ship of claim 7 wherein the reels are generally parallel to one another.

12. The pipeline laying apparatus of claim 7 wherein the welding stations are in between the reels and the hull stern.

13. The pipeline laying apparatus of claim 7 wherein the welding stations include a firing line that travels laterally so that a welded pipeline can be welded at the firing line and wound upon a selected reel in a manner that is coordinated with drum rotation.

14. A pipe laying ship comprising:
   a) a dynamically positioned barge or self propelled dynamically positioned hull having a deck having a bow, a stern and a moon pool opening amidships;
   b) a pair of reels supported upon the deck next to the moon pool opening and behind the moon pool opening, each reel being independently rotatable and configured to hold a pipeline independently of the other reel;
   c) one or more pipeline welding stations on the deck behind the reels, the pipeline welding stations being positioned to weld joints of pipe together to form a pipeline that can be wound upon a selected reel;
   d) a pipe bending device on the deck for bending pipe that is to be wound upon a selected reel;
   e) a tower for guiding a welded pipeline as it is unwound from a selected reel, the tower including a bend controller, a straightener and a tensioner; and
   f) wherein the welding stations and tower are laterally movable between positions that enable a pipeline to be welded and wound upon either the port or starboard reel and to be unwound from either the port or starboard reel for launching to the seabed.

15. The pipeline laying apparatus of claim 14 wherein the welding stations are in between the reels and the hull stern.

16. The pipeline laying apparatus of claim 14 wherein the welding stations include a firing line that travels laterally so that a welded pipeline can be welded at the firing line and wound upon a selected reel in a manner that is coordinated with drum rotation.

17. The pipeline laying ship of claim 14 wherein the reels are each supported to rotate about a generally horizontal axis.

18. The pipeline laying ship of claim 14 wherein the reels are generally parallel to one another.

19. A method of laying a pipeline on a seabed, comprising the steps of:
   a) progressively joining together lengths of pipe upon the deck of a vessel at a firing line to form a long pipeline, the vessel having a pair of reels and a tower for launching the pipeline;
   b) winding the pipeline upon a selected reel of the pair of reels as the lengths of pipe are joined together at the firing line;
   c) bending the pipeline to approximate the curvature of the reel before winding the pipeline upon the selected reel;
   d) after a selected reel is wound with a pipeline of selected length, moving the selected reel along a path in which the pipeline is to be laid, while unwinding the pipeline from the reel and simultaneously straightening the pipeline;
   e) wherein the pair of reels are independently rotatable so that either reel can be wound with a pipeline in step "a", independently of the other;
   f) moving the firing line in a port to starboard direction that aligns the pipeline as it is being formed with a selected reel during the winding step "b"; and
   g) moving the tower in a port to starboard direction that aligns the tower with a selected reel during unwinding step "b".

20. The method of claim 19 wherein the reels rotate about a generally horizontal axis in step "b".

21. The method of claim 19 further comprising the step of passing the straightened pipeline through a tensioner.

22. The method of claim 21 further comprising the step of using the combined tension imposed on the pipeline by the tensioners and drum back tension to compensate for the suspended weight of the pipeline during its travel from the hull to the seabed.

23. The method of claim 22 further comprising the step of adjusting the tension depending upon pipe laying parameters that include pipeline characteristics and water depth during the pipe laying operation.

24. The method of claim 23, providing a tower to guide the pipeline from the selected reel to the seabed.

25. The method of claim 24, further comprising the step of coordinating the tension applied by the tensioner as the ship moves along the pipeline route to insure that the stresses in the pipeline are maintained within acceptable limits.

26. The method of claim 25 further comprising the step of using a hold off clamp to support the pipeline so that corrosion and insulating coating can be applied thereto.

* * * * *